Sept. 8, 1942.　　　R. P. HANNA　　　2,295,400
TROLLEY DEVICE
Filed Nov. 27, 1940
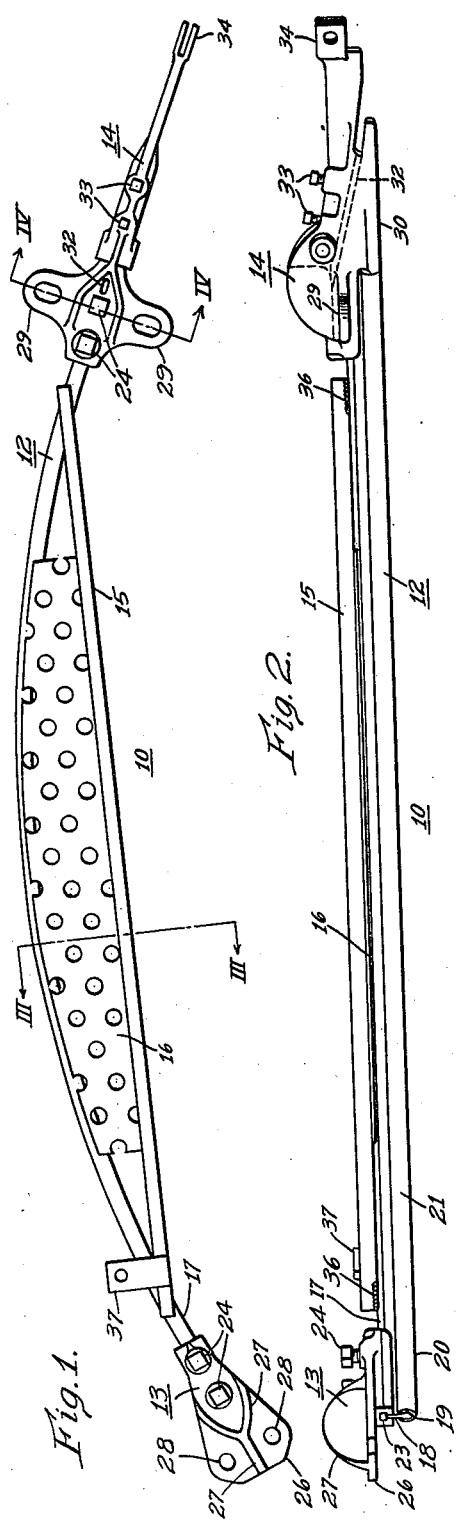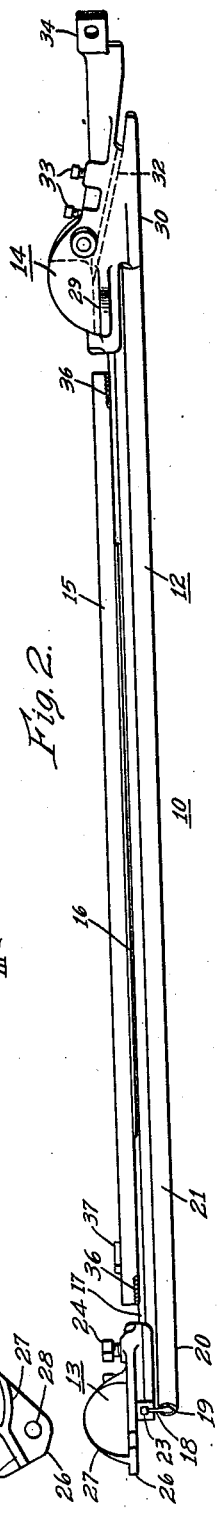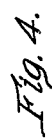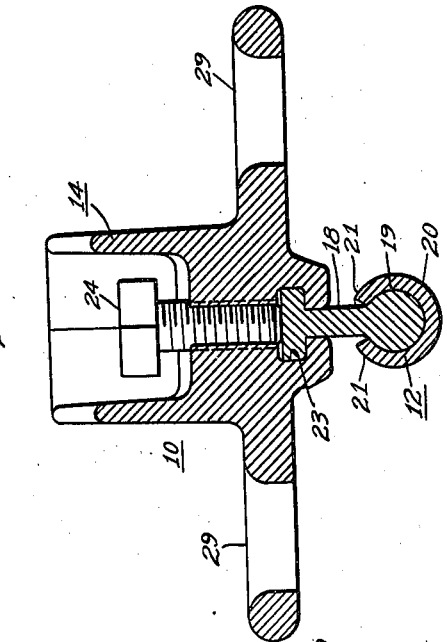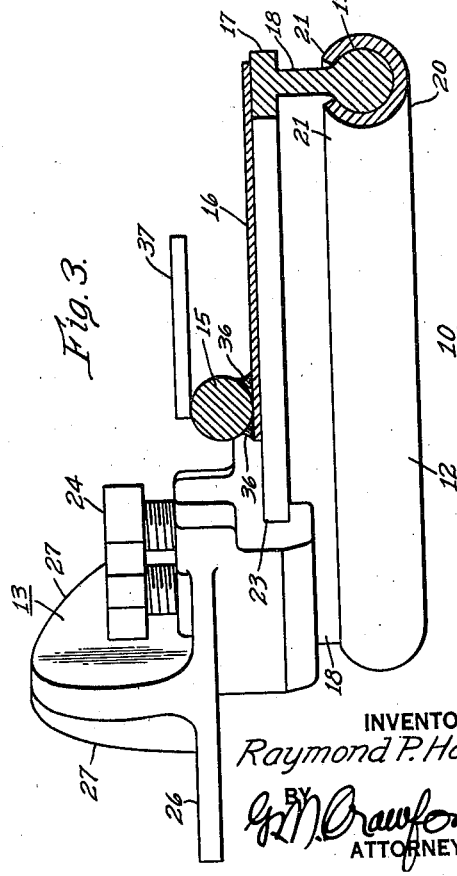
INVENTOR
Raymond P. Hanna.
BY G. M. Crawford
ATTORNEY Patented Sept. 8, 1942

2,295,400

UNITED STATES PATENT OFFICE 2,295,400

TROLLEY DEVICE

Raymond P. Hanna, Pittsburgh, Pa., assignor to Westinghouse Electric & Manufacturing Company, East Pittsburgh, Pa., a corporation of Pennsylvania Application November 27, 1940, Serial No. 367,360

11 Claims. (Cl. 191—35)

My invention relates, generally, to trolley devices, and it has reference in particular to a curved segment or trolley conductor device for use in trolley conductor systems.

Generally stated, it is an object of my invention to provide a curved trolley conductor device which shall be simple and inexpensive to manufacture and may be readily installed and easily serviced.

More specifically, it is an object of my invention to provide for reenforcing a curved runner member in a trolley conductor device so as to relieve the runner member of at least a considerable portion of the stresses normally applied thereto.

Another object of the invention is to provide a simple and inexpensive reenforced rigid curved runner member for trolley conductor systems.

Yet another object of my invention is to provide a relatively light and strong perforated deflector for preventing a current collector from becoming wedged between angularly related portions of a trolley conductor device.

A further object of my invention is to provide for preventing a current collector from becoming wedged between the runner member and tension member of a curved trolley conductor device in a trolley conductor system.

Still another object of the invention is to utilize a perforated metal screen which does not collect snow and ice for preventing a de-wired current collector from becoming wedged in a pocket between portions of a trolley conductor device.

Other objects will, in part, be obvious and will, in part, appear hereinafter.

In practicing my invention in the preferred form, the curved segment or trolley conductor device may comprise a relatively light weight curved runner member provided with a renewable wear surface along the lower edge to guide a current collector and end members secured thereto for making connections to associated trolley devices, or a trolley conductor. A substantially straight tension member may be connected between the ends of the runner member to transmit the principal stresses between the end members and relieve the principal portion of the runner member from the stresses normally applied thereto. A deflector guard or shield comprising a perforated metal screen may be positioned between the curved runner member and the tension member to substantially enclose the arcuate space therebetween and prevent a de-wired current collector from becoming wedged therein.

For a more complete understanding of the nature and scope of my invention, reference may be made to the following detailed description and the accompanying drawing, in which:

Figure 1 is a plan view of a curved segment or trolley conductor device embodying the principal features of the invention;

Fig. 2 is a side elevational view of the segment or conductor device of Fig. 1;

Fig. 3 is an enlarged sectional view taken along the line III—III of Fig. 1; and Fig. 4 is an enlarged sectional view taken along the line IV—IV of Fig. 1.

Referring to Figs. 1 and 2 of the drawing, the reference numeral 10 may denote, generally, a substantially rigid curved segment or trolley conductor device for use in overhead trolley conductor systems. The curved segment 10 may comprise, generally, a relatively light weight curved runner member 12 provided with end members 13 and 14 for connecting the runner member to associated trolley devices or a trolley conductor (not shown), a substantially straight tension member 15 and a deflector guard or shield 16.

Referring to Figs. 2, 3 and 4, it will be seen that the runner member 12 may be of relatively light weight construction since it is reenforced by the tension member 15, and may comprise a structural steel shape or a formed section of any suitable metal, such as, for example, T-section having a flat back portion 17 with a depending leg 18. The leg 18 may be provided with an enlarged rounded lower edge 19 of substantially the size of the trolley conductor with which it may be associated to provide for guiding a current collector. A renewable wear surface may be provided for the runner member, by applying a substantially U-shaped sheath 20 to the lower edge and pressing the upstanding sides 21 thereof inwardly about the enlarged edge 19.

Referring particularly to Figs. 3 and 4, it will be seen that the end members 13 and 14 may be provided with T-shaped grooves 23 on the lower sides to receive the end portions of the runner member 12. The end members may be detachably connected to the curved runner 12 by means of set screws 24 which clamp the end portions of the runner member in the T-shaped grooves 23, which conform to the cross-section of the runner member. The end member 13 may be provided with a substantially flat flanged end portion 26 having a reenforcing rib 27 and bolt holes 28 for connection to an associated trolley device (not shown), such as, for example, a trolley frog or crossing, to which the curved segment 10 may be attached.

The end member 14 which is disposed for attachment to a trolley conductor (not shown), may be provided with laterally extending eyes 29 for connecting suitable guy wires or insulating spacers thereto. A runner portion 30 may be provided on the lower side in alinement with the enlarged edge 19 of the runner member. Means, such as the upwardly sloping opening 32, may be provided in the body portion of the end member 14 wherein a trolley conductor may be secured by means of set screws 33. A clevis 34 may be provided adjacent the end of the end member 14 for connecting a suitable approach member (not shown) thereto to provide for a smooth transfer of a current collector from a trolley conductor (not shown) to the end member.

The auxiliary tension member 15 is utilized to relieve the curved runner member 12 of at least a large portion of the principal stresses usually applied to a trolley device connected in a trolley conductor system by reason of the relatively high tension at which the trolley conductor must be maintained. The tension member may, for example, comprise a substantially rigid bar or rod connected either to the end members themselves or to the end portions of the runner member, being, for example, welded to the back portion 17 adjacent the end portions, by welds 36, so as to be clear of any current collector. An ear 37 may be provided adjacent one end of the device, being for example attached to the rod 15 for securing a deflector or shield thereto where the device is utilized in connection with a trolley device to prevent a de-wired current collector from catching in a pocket between the device and an adjacent trolley conductor or trolley device.

In order to prevent a current collector when de-wired from entering the opening between the tension member 15 and the curved runner member 12, and becoming wedged therein adjacent either end of the opening where it narrows, suitable means, such as the deflector or guard member 16, may be positioned between the tension member 15 and the curved runner member 12. The deflector may, for example, comprise a segment of expanded wire screen or perforated sheet metal, as shown, and may be secured to the curved runner member and tension member in any suitable manner, such as by welding. The deflector serves not only as a protective guard, but it also reenforces the curved runner member, making the curved segment more rigid. Such a deflector is further advantageous in that it prevents ice, snow, or rain water from collecting thereon.

A curved segment or trolley device embodying the features of my invention may find many applications in trolley conductor systems. One application, however, which is of particular importance is at intersections between different pairs of trolley conductors in trolley bus conductor systems or at intersections between trolley bus and street car conductor systems. Where trolley frogs are used, it is extremely advantageous to utilize rigid curved segments such as I have disclosed in connection with the trolley frogs, crossings, etc., to provide the curved portion of the branch or intersecting trolley conductor immediately adjacent the main or straight conductor. The curved segment may be directly attached to a trolley frog at one end, and to a crossing or a conductor at the other end, depending on the particular type of intersection where it is used. The rigid segment is self-supporting and requires no lateral guy wires or pull-offs to maintain the desired curve. It also provides a perfectly smooth curve and is light and durable.

From the above description and the accompanying drawing, it will be apparent that I have provided a curved segment for trolley conductor systems which is simple and inexpensive to manufacture and which may be readily installed. Since the curved runner member is not required to withstand the full tension of the trolley conductor or other trolley device to which it may be connected, the runner member may be of relatively light construction. The tension member transmits substantially all the tension between the end members and prevents appreciable deflection of the curved runner member from the desired curvature. The perforated deflector not only guards against a de-wired current collector becoming wedged between the curved runner member and the tension member, and prevents ice and snow from collecting upon its surface, but it also assists in connecting the tension member and the curved runner member to provide a more rigid and unitary construction.

Since different embodiments of the invention may be made without departing from the spirit and scope thereof, it is intended that all matter contained in the above description and shown in the accompanying drawing shall be considered merely as illustrative and not in a limiting sense.

I claim as my invention:

1. A curved trolley conductor segment comprising, a curved runner member having a guide surface along the lower edge to guide a current collector, a tension member connecting the end portions of the runner member and spaced therefrom intermediate the ends, and end members adjacent the ends of the runner member for connecting the segment in a trolley conductor system.

2. In combination, a curved runner member having a lower edge portion for guiding a current collector, and a tension bar operable to maintain the curvature of the runner member connected between the end portions of the runner member adjacent the upper edge and spaced therefrom intermediate the ends.

3. A curved conductor member for trolley conductor systems comprising, an arcuate structural steel runner member, end members secured adjacent the ends of the runner member to secure it in a conductor system in place of a portion of a trolley conductor, and a substantially straight chordal tension bar connected to the runner member adjacent the ends to transmit the tension of the trolley conductor between the end members.

4. In combination, a curved runner member, a chordal tension member connected to the runner member adjacent the ends thereof, and a perforated screen positioned in the space between the runner member and the tension member.

5. The combination in a curve segment for a trolley bus trolley conductor system, of an elongated curved member having a runner portion on the lower edge, a tension bar connected adjacent the ends of the curved member for transmitting tension from one end of the curved member to the other, and a guard positioned between the tension bar and the runner member.

6. In combination, a curved structural steel runner member for use instead of a portion of a trolley conductor, end members secured to the runner member adjacent the ends, and a relatively thin tension bar connecting the ends of the runner member to transmit tension from one end member to the other.

7. A trolley conductor device for a trolley conductor system comprising, a relatively light runner member having a guide surface along the lower edge for guiding a current collector, end members secured adjacent the ends of the runner member to connect it in the trolley conductor system in place of a portion of the conductor, and a substantially rigid tension member connected to the upper edge of the runner member adjacent the ends thereof to transmit the tension of the conductor between the said ends.

8. In combination, a curved runner member having a renewable wear surface along the lower edge, end members detachably secured to the runner member adjacent the ends to connect it in a trolley system and transmit the strain thereof, and a tension member connected between the ends of the runner member adjacent the end members to relieve the curved member of said strain.

9. A trolley device comprising, a curved runner having a substantially T-section with a renewable wear surface secured about the lower edge of the depending leg thereof, end members for connecting the runner member in a trolley conductor system to transmit the tension load of the conductor system having T-shaped openings to receive the end portions of the runner member and means to secure the end portions therein, and a chordal tension bar connected to the runner member adjacent each end to transmit the tension load therebetween.

10. A curved trolley conductor segment comprising, a laterally curved runner member, and a substantially rigid reenforcing bar positioned on the concave side of the runner member connected adjacent the ends thereof to maintain the curvature of the runner member and spaced therefrom intermediate the ends.

11. In combination, an arcuate runner member having a guide surface for a current collector adjacent the lower edge, and an elongated chordal reenforcing member bridging the ends of the runner member and spaced therefrom intermediate the ends to maintain the curvature of the runner member.

RAYMOND P. HANNA.